(12) United States Patent
Reed (10) Patent No.: US 10,032,241 B2
(45) Date of Patent: *Jul. 24, 2018

(54) DETECTION FROM TWO CHROMINANCE DIRECTIONS

(71) Applicant: Digimarc Corporation, Beaverton, OR (US)

(72) Inventor: Alastair M. Reed, Lake Oswego, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/445,874

(22) Filed: Feb. 28, 2017

(65) Prior Publication Data

US 2017/0301055 A1 Oct. 19, 2017

Related U.S. Application Data

(63) Continuation of application No. 15/005,865, filed on Jan. 25, 2016, now Pat. No. 9,582,844, which is a
(Continued)

(51) Int. Cl.
*G06K 9/00* (2006.01)
*G06T 1/00* (2006.01)
*G06T 7/90* (2017.01)
*H04B 1/3827* (2015.01)

(52) U.S. Cl.
CPC .............. *G06T 1/005* (2013.01); *G06T 7/90* (2017.01); *H04B 1/3833* (2013.01);
(Continued)

(58) Field of Classification Search
CPC ............ G06T 1/005; G06T 2201/0052; G06T 2201/0065; G06T 7/90; G06T 2207/10024; G06T 2207/20224
See application file for complete search history.

(56) References Cited

U.S. PATENT DOCUMENTS 4,504,084 A 3/1985 Jauch
4,725,462 A 2/1988 Kimura
(Continued)

OTHER PUBLICATIONS

'Holographic signatures for digital images,' The Seybold Report on Desktop Publishing, Aug. 1995, 1 pg.
(Continued)

*Primary Examiner* — Shefali Goradia
(74) *Attorney, Agent, or Firm* — Digimarc Corporation (57) ABSTRACT

The present disclosure relates generally to signal processing, including processing digital watermarking. One claim recites a detector apparatus comprising: memory for storing data representing color image data comprising red color data and green color data, in which the red color data comprises digital watermarking including a first polarity and the green color data comprises the digital watermarking including a second polarity that is inversely related to the first polarity; means for selectively weighting the red color data and the green color data so that the digital watermarking is emphasized while image content is de-emphasized when weighted red color data and weighted green color data are combined; means for detecting the digital watermarking from combined, weighted red color data and weighted green color data; and more or more processors configured for outputting data corresponding to detected digital watermarking. Of course, different combinations and claims are provided too.

17 Claims, 6 Drawing Sheets

Related U.S. Application Data continuation of application No. 14/189,617, filed on Feb. 25, 2014, now Pat. No. 9,245,308, which is a continuation of application No. 13/494,849, filed on Jun. 12, 2012, now Pat. No. 8,660,298, which is a continuation of application No. 12/634,505, filed on Dec. 9, 2009, now Pat. No. 8,199,969, which is a continuation-in-part of application No. 12/337,029, filed on Dec. 17, 2008, now Pat. No. 9,117,268.

(52) U.S. Cl.
CPC ........... *G06T 2201/0052* (2013.01); *G06T 2201/0065* (2013.01); *G06T 2207/10024* (2013.01); *G06T 2207/20224* (2013.01)

(56) References Cited

U.S. PATENT DOCUMENTS

| | | | |
|---|---|---|---|
| 4,739,377 A | 4/1988 | Allen | |
| 4,926,247 A | 5/1990 | Nagasaki | |
| 5,051,835 A | 9/1991 | Bruehl | |
| 5,093,147 A | 3/1992 | Andrus | |
| 5,291,243 A | 3/1994 | Heckman | |
| 5,337,361 A | 8/1994 | Wang | |
| 5,363,212 A | 11/1994 | Taniuchi | |
| 5,385,371 A | 1/1995 | Izawa | |
| 5,481,377 A | 1/1996 | Udagawa | |
| 5,502,576 A | 3/1996 | Ramsay | |
| 5,530,751 A | 6/1996 | Morris | |
| 5,530,759 A | 6/1996 | Braudaway | |
| 5,557,412 A | 9/1996 | Saito | |
| 5,568,555 A | 10/1996 | Shamir | |
| 5,572,433 A | 11/1996 | Falconer | |
| 5,617,119 A | 4/1997 | Briggs | |
| 5,621,810 A | 4/1997 | Suzuki | |
| 5,636,874 A | 6/1997 | Singer | |
| 5,646,997 A | 7/1997 | Barton | |
| 5,652,626 A | 7/1997 | Kawakami | |
| 5,659,628 A | 8/1997 | Tachikawa | |
| 5,659,726 A | 8/1997 | Sandford | |
| 5,661,574 A | 8/1997 | Kawana | |
| 5,687,236 A | 11/1997 | Moskowitz | |
| 5,689,623 A | 11/1997 | Pinard | |
| 5,696,594 A | 12/1997 | Saito | |
| 5,721,788 A | 2/1998 | Powell | |
| 5,729,741 A | 3/1998 | Liaguno | |
| 5,748,763 A | 5/1998 | Rhoads | |
| 5,760,386 A | 6/1998 | Ward | |
| 5,787,186 A | 7/1998 | Schroeder | |
| 5,788,285 A | 8/1998 | Wicker | |
| 5,790,693 A | 8/1998 | Graves | |
| 5,790,703 A | 8/1998 | Wang | |
| 5,809,139 A | 9/1998 | Girod | |
| 5,822,436 A | 10/1998 | Rhoads | |
| 5,825,892 A | 10/1998 | Braudaway | |
| 5,832,186 A | 11/1998 | Kawana | |
| 5,838,814 A | 11/1998 | Moore | |
| 5,862,218 A | 1/1999 | Steinberg | |
| 5,862,260 A | 1/1999 | Rhoads | |
| 5,875,249 A * | 2/1999 | Mintzer ............... G06T 1/0021 283/113 | |
| 5,893,101 A | 4/1999 | Balogh | |
| 5,905,800 A | 5/1999 | Moskowitz | |
| 5,905,819 A | 5/1999 | Daly | |
| 5,915,027 A | 6/1999 | Cox | |
| 5,919,730 A | 7/1999 | Gasper | |
| 5,930,369 A | 7/1999 | Cox | |
| 5,933,798 A | 8/1999 | Linnartz | |
| 5,946,414 A | 8/1999 | Cass | |
| 5,951,055 A | 9/1999 | Mowry | |
| 5,960,081 A | 9/1999 | Vynne | |
| 5,960,103 A | 9/1999 | Graves | |
| 5,974,548 A | 10/1999 | Adams | |
| 5,978,013 A | 11/1999 | Jones | |
| 5,991,426 A | 11/1999 | Cox | |
| 6,045,656 A | 4/2000 | Foster | |
| 6,046,808 A | 4/2000 | Fateley | |
| 6,054,021 A | 4/2000 | Kurrle | |
| 6,081,827 A | 6/2000 | Reber | |
| 6,094,483 A | 7/2000 | Fridrich | |
| 6,104,812 A | 8/2000 | Koltai | |
| 6,122,403 A | 9/2000 | Rhoads | |
| 6,128,411 A | 10/2000 | Knox | |
| 6,136,752 A | 10/2000 | Paz-Pujalt | |
| 6,185,312 B1 | 2/2001 | Nakamura | |
| 6,185,683 B1 | 2/2001 | Ginter | |
| 6,192,138 B1 | 2/2001 | Yamadaji | |
| 6,201,879 B1 | 3/2001 | Bender | |
| 6,233,347 B1 | 5/2001 | Chen | |
| 6,233,684 B1 | 5/2001 | Stefik | |
| 6,234,537 B1 | 5/2001 | Gutmann | |
| 6,246,777 B1 | 6/2001 | Agarwal | |
| 6,272,176 B1 | 8/2001 | Srinivasan | |
| 6,272,248 B1 | 8/2001 | Saitoh | |
| 6,272,634 B1 | 8/2001 | Tewfik | |
| 6,278,792 B1 | 8/2001 | Cox | |
| 6,281,165 B1 | 8/2001 | Cranford | |
| 6,285,776 B1 | 9/2001 | Rhoads | |
| 6,304,345 B1 | 10/2001 | Patton | |
| 6,314,192 B1 | 11/2001 | Chen | |
| 6,320,675 B1 | 11/2001 | Sakaki | |
| 6,332,031 B1 | 12/2001 | Rhoads | |
| 6,332,194 B1 | 12/2001 | Bloom | |
| 6,334,187 B1 | 12/2001 | Kadono | |
| 6,356,363 B1 | 3/2002 | Cooper | |
| 6,373,965 B1 | 4/2002 | Liang | |
| 6,390,362 B1 | 5/2002 | Martin | |
| 6,394,358 B1 | 5/2002 | Thaxton | |
| 6,404,926 B1 | 6/2002 | Miyahara | |
| 6,418,232 B1 | 7/2002 | Nakano | |
| 6,427,020 B1 | 7/2002 | Rhoads | |
| 6,438,251 B1 | 8/2002 | Yamaguchi | |
| 6,456,726 B1 | 9/2002 | Yu | |
| 6,481,753 B2 | 11/2002 | Van | |
| 6,590,996 B1 | 7/2003 | Reed | |
| 6,591,009 B1 | 7/2003 | Usami | |
| 6,614,914 B1 | 9/2003 | Rhoads | |
| 6,636,615 B1 | 10/2003 | Rhoads | |
| 6,697,498 B2 | 2/2004 | Kawaguchi | |
| 6,721,440 B2 | 4/2004 | Reed | |
| 6,763,122 B1 * | 7/2004 | Rodriguez ............ G06T 1/0028 358/3.28 | |
| 6,973,195 B1 | 12/2005 | Matsui | |
| 7,280,669 B2 | 10/2007 | Choi | |
| 7,369,677 B2 | 5/2008 | Petrovic | |
| 7,662,638 B2 * | 2/2010 | Dadala ............... G01N 30/8675 436/161 | |
| 7,961,904 B2 | 6/2011 | Sugahara | |
| 8,199,969 B2 | 6/2012 | Reed | |
| 8,363,161 B2 | 1/2013 | Pearlstein | |
| 8,539,333 B2 * | 9/2013 | Kanzaki ............ G06F 17/30896 715/210 | |
| 8,660,298 B2 | 2/2014 | Reed | |
| 9,106,914 B2 * | 8/2015 | Doser .................. H04N 19/176 | |
| 9,117,268 B2 | 8/2015 | Reed | |
| 9,245,308 B2 | 1/2016 | Reed | |
| 9,582,844 B2 | 2/2017 | Reed | |
| 2002/0021824 A1 | 2/2002 | Reed | |
| 2002/0027612 A1* | 3/2002 | Brill ..................... G06T 1/0071 348/473 | |
| 2002/0067844 A1 | 6/2002 | Reed | |
| 2004/0227854 A1 | 11/2004 | Withers | |
| 2005/0031159 A1 | 2/2005 | Rhoads | |
| 2006/0023913 A1* | 2/2006 | Muratani ........... H04N 1/00002 382/100 | |
| 2007/0196024 A1 | 8/2007 | Tian | |

OTHER PUBLICATIONS

'RGB Color Wheel,' 2015, [retrieved Apr. 1, 2015]. Retrieved from the Internet: < URL: http:// http://timvandevall.com/wp-content/uploads/2013/08/Color-Wheel-Template-0-2.png>, p. 1.

(56) References Cited

OTHER PUBLICATIONS

Alattar, "Smart Images' Using Digimarc's Watermarking Technology," IS&T/SPIE's 12th Int. Symposium Oil Electronic Imaging, San Jose, CA, Jan. 25, 2000, vol. 3971 No. 25, 10 pages.

Apr. 11, 2012 Notice of Allowance; Apr. 3, 2012 Amendment; and Mar. 13, 2012 Non-final Office Action; all from U.S. Appl. No. 12/634,505. pp. 1-25.

Battiato et al., 'Robust Watermarking for Images Based on Color Manipulation,' IH/99 LNCS 1768, pp. 302-317, 2000.

Bender et al., 'Applications for Data Hiding,' IBM Systems Journal, vol. 39, Nos. 3&4, 2000, pp. 547-568.

Bors et al., 'Image Watermarking Using DCT Domain Constraints,' Sep. 1996, Proc. IEEE Int. Conf. on Image Processing, vol. 3, pp. 231-234.

Brownell, 'Counterfeiters Dye Over Security Measures,' SPIE's OE Magazine, Sep. 2001, pp. 8-9.

Fleet et al., 'Embedding Invisible Information in Color Images,' Proc. Int. Conf. on Image Processing, vol. 1, pp. 532-535, Oct. 1997.

Frequently Asked Questions About Digimarc Signature Technology, Aug. 1, 1995, http://www.digimarc.com, 9 pages.

Hunt, 'The Reproduction of Colour in Photography, Printing & Television,' 1987, pp. 588-589 and Plate 35 (in color).

Jul. 15, 2015 Amendment After Notice of Allowance and Statement regarding Reasons for Allowance; Apr. 15, 2015 Notice of Allowance; Mar. 19, 2015 Amendment Accompanying RCE; Feb. 20, 2014 Final Office Action; Jan. 17, 2014 Amendment; Jul. 17, 2014 Non-final Office Action; Jul. 5, 2013 Amendment accompanying RCE; Jun. 5, 2012 Final Office Action; all from applicant's U.S. Appl. No. 12/337,029 (published as US 2010-0150434 A1). 123 pages.

Kohda et al., 'Digital Watermarking Through CDMA Channels Using Spread Spectrum Techniques,' 2000 IEEE, pp. 671-674.

Komatsu, 'A Proposal on Digital Watermark in Document Image Communication and Its Application to Realizing a Signature,' Nov. 1990, Electronics and Communications in Japan, Part 1, vol. 73, No. 5, pp. 22-33.

Komatsu, 'Authentication System Using Concealed Image in Telematics,' Oct. 1998, Memoirs of the School of Science and Engineering, Waseda Univ., No. 52, pp. 45-60.

Kutter et al., 'Digital Signature of Color Images Using Amplitude Modulation,' SPIE vol. 3022, 1997, pp. 518-526.

Nov. 16, 2011 Office Action from U.S. Appl. No. 12/337,029 (pp. 1-23).

Nov. 8, 2011 Office Action; and Oct. 13, 2011 Amendment Accompanying Request for Continued Examination, all from U.S. Appl. No. 10/602,549. (pp. 1-22).

ORuanaidh et al, 'Watermarking Digital Images for Copyright Protection,' http://www.kalman.mee.tcd.ie/people/jjr/eva.sub.--pap.htm, Feb. 2, 1996, 8 pages.

Piva et al., 'Exploiting the Cross-Correlation of RGB-Channels for Robust Watermarking of Color Images,' 1999 IEEE, pp. 306-310.

Tsang et al. 'Robust and High Quality Video Watermarking with the use of Temporal Redundancy,' in Security and Watermarking of Multimedia Contents III, Ping Wah Wong, Edward J. Delp III, Editors, Proceedings of SPIE vol. 4314, pp. 55-63, 2001.

U.S. Appl. No. 09/465,418, Rhoads et al., filed Dec. 16, 1999. (18 pages).

U.S. Appl. No. 09/562,516, Rodriguez et al., filed May 1, 2000 (14 pages).

U.S. Appl. No. 09/619,264, Kumar, filed Jul. 19, 2000. (12 pages).

U.S. Appl. No. 60/323,148, Davis et al., filed Sep. 17, 2001. (9 pages).

U.S. Appl. No. 60/082,228, Rhoads, filed Apr. 16, 1998. (18 pages).

Vidal et al., 'Non-Noticeable Information Embedding in Color Images: Marking and Detection,' IEEE (1999), pp. 293-297.

Voyatzis et al., 'Embedding Robust Watermarks by Chaotic Mixing,' Digital Signal Processing Proceedings, IEEE Jul. 1977, pp. 213-216, vol. 1.

Wang et al., 'Embedding Digital Watermarks in Halftone Screens,' Security and Watermarking of Multimedia Contents II, Proc. of SPIE vol. 3971 (2000), pp. 218-227.

\* cited by examiner

DETECTION FROM TWO CHROMINANCE DIRECTIONS

RELATED APPLICATION DATA

This application is a continuation of U.S. patent Ser. No. 15/005,865, filed Jan. 25, 2016 (now U.S. Pat. No. 9,582,844) which is a continuation of U.S. patent Ser. No. 14/189,617, filed Feb. 25, 2014 (now U.S. Pat. No. 9,245,308) which is a continuation of U.S. patent application Ser. No. 13/494,849, filed Jun. 12, 2012 (now U.S. Pat. No. 8,660,298), which is a continuation of U.S. patent application Ser. No. 12/634,505, filed Dec. 9, 2009 (now U.S. Pat. No. 8,199,969), which is a continuation-in-part of U.S. patent application Ser. No. 12/337,029, filed Dec. 17, 2008 (now U.S. Pat. No. 9,117,268). The above patent documents are each hereby incorporated herein by reference in its entirety.

TECHNICAL FIELD

The present invention relates generally to steganographic data hiding and digital watermarking.

BACKGROUND AND SUMMARY

The term "steganography" generally means data hiding. One form of data hiding is digital watermarking. Digital watermarking is a process for modifying media content to embed a machine-readable (or machine-detectable) signal or code into the media content. For the purposes of this application, the data may be modified such that the embedded code or signal is imperceptible or nearly imperceptible to a user, yet may be detected through an automated detection process. Most commonly, digital watermarking is applied to media content such as images, audio signals, and video signals.

Digital watermarking systems may include two primary components: an embedding component that embeds a watermark in media content, and a reading component that detects and reads an embedded watermark. The embedding component (or "embedder" or "encoder") may embed a watermark by altering data samples representing the media content in the spatial, temporal or some other domain (e.g., Fourier, Discrete Cosine or Wavelet transform domains). The reading component (or "reader" or "decoder") analyzes target content to detect whether a watermark is present. In applications where the watermark encodes information (e.g., a message or payload), the reader may extract this information from a detected watermark.

A watermark embedding process may convert a message, signal or payload into a watermark signal. The embedding process then combines the watermark signal with media content and possibly another signals (e.g., an orientation pattern or synchronization signal) to create watermarked media content. The process of combining the watermark signal with the media content may be a linear or non-linear function. The watermark signal may be applied by modulating or altering signal samples in a spatial, temporal or some other transform domain.

A watermark encoder may analyze and selectively adjust media content to give it attributes that correspond to the desired message symbol or symbols to be encoded. There are many signal attributes that may encode a message symbol, such as a positive or negative polarity of signal samples or a set of samples, a given parity (odd or even), a given difference value or polarity of the difference between signal samples (e.g., a difference between selected spatial intensity values or transform coefficients), a given distance value between watermarks, a given phase or phase offset between different watermark components, a modulation of the phase of the host signal, a modulation of frequency coefficients of the host signal, a given frequency pattern, a given quantizer (e.g., in Quantization Index Modulation) etc.

The present assignee's work in steganography, data hiding and digital watermarking is reflected, e.g., in U.S. Pat. Nos. 6,947,571; 6,912,295; 6,891,959. 6,763,123; 6,718,046; 6,614,914; 6,590,996; 6,408,082; 6,122,403 and 5,862,260, and in published specifications WO 9953428 and WO 0007356 (corresponding to U.S. Pat. Nos. 6,449,377 and 6,345,104). Each of these patent documents is hereby incorporated by reference herein in its entirety. Of course, a great many other approaches are familiar to those skilled in the art. The artisan is presumed to be familiar with a full range of literature concerning steganography, data hiding and digital watermarking.

One possible combination of the disclosed technology is a method including: receiving a color image or video; transforming the color image or video signal by separating the color image or video into at least first data representing a first color channel of the color image or video and second data representing a second color channel of the color image or video, where the first data comprises a digital watermark signal embedded therein and the second data comprises the digital watermark signal embedded therein with a signal polarity that is inversely related to the polarity of the digital watermark signal in the first data; subtracting the second data from the first data to yield third data; using at least a processor or electronic processing circuitry, analyzing the third data to detect the digital watermark signal; once detected, providing information associated with the digital watermark signal.

Another combination is a method including: obtaining first data representing a first chrominance channel of a color image or video, where the first data comprises a watermark signal embedded therein; obtaining second data representing a second chrominance channel of the color image or video, the second data comprising the watermark signal embedded therein but with a signal polarity that is inversely related to the polarity of the watermark signal in the first data; combining the second data with the first data in manner that reduces image or video interference relative to the watermark signal, said act of combining yielding third data; using at least a processor or electronic processing circuitry, processing the third data to obtain the watermark signal; once obtained, providing information associated with the watermark signal.

Still another combination is an apparatus comprising: a processor or electronic processing circuitry to control: (a) handling of first data representing a first color channel of a color image or video, where the first data comprises a watermark signal embedded therein; (b) handling of second data representing a second color channel of the color image or video, the second data comprising the watermark signal embedded therein but with a signal polarity that is inversely related to the polarity of the watermark signal in the first data; (c) combining the second data with the first data in manner that reduces image or video interference relative to the watermark signal, the combining yielding third data; (d) processing the third data to obtain the watermark signal; and (e) once obtained, providing information associated with the watermark signal.

Yet another possible combination is a method including: a method including: obtaining first data representing a first chrominance channel of a color image or video signal;

obtaining second data representing a second chrominance channel of the color image or video signal; using a processor or electronic processing circuitry, embedding a watermark signal in the first data with a first signal polarity; using a processor or electronic processing circuitry, transforming the second data by embedding the watermark signal in the second data so that when embedded in the second data the watermark signal comprises a second signal polarity that is inversely related to the first signal polarity of the watermark signal in the first data; combining the watermarked first data and the watermarked second data to yield a watermarked version of the color image or video signal, whereby during detection of the watermark signal from the watermarked version of the color image or video signal, the second data is combined with the first data in a manner that reduces image or video signal interference relative to the watermark signal.

Further combinations, aspects, features and advantages will become even more apparent with reference to the following detailed description and accompanying drawing.

DETAILED DESCRIPTION

The following disclosure discusses a digital watermarking technique that utilizes at least two chrominance channels (also called "color planes," "color channels" and/or "color direction"). Chrominance is generally understood to include information, data or signals representing color components of an image or video. In contrast to a color image or video, a grayscale (monochrome) image or video has a chrominance value of zero.

Figure 1:
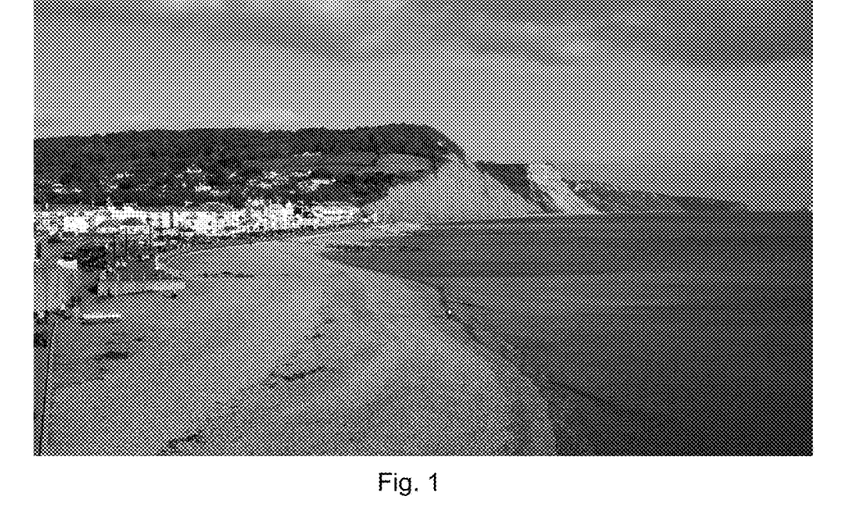
FIG. 1 represents a color image.
Figure 2:
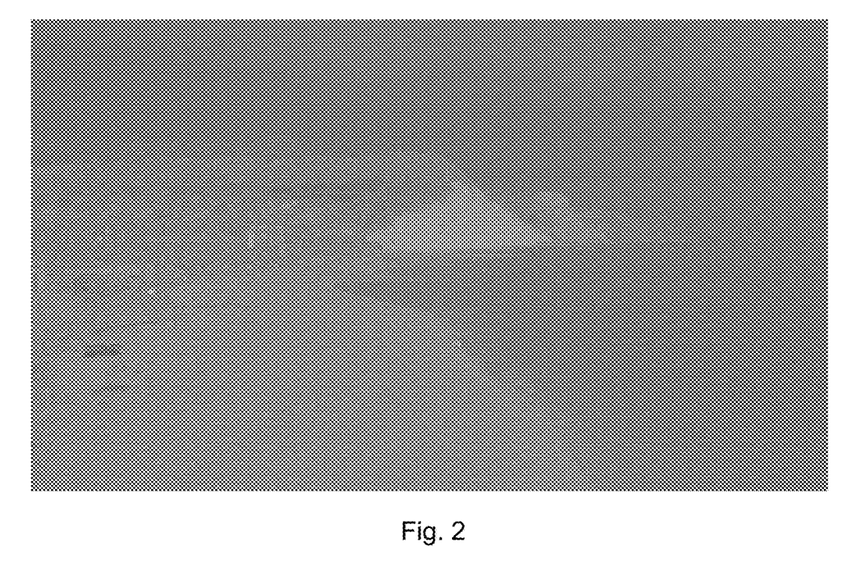
FIG. 2 represents a first color channel ('a' channel) of the color image representation shown in FIG. 1.
Figure 3:
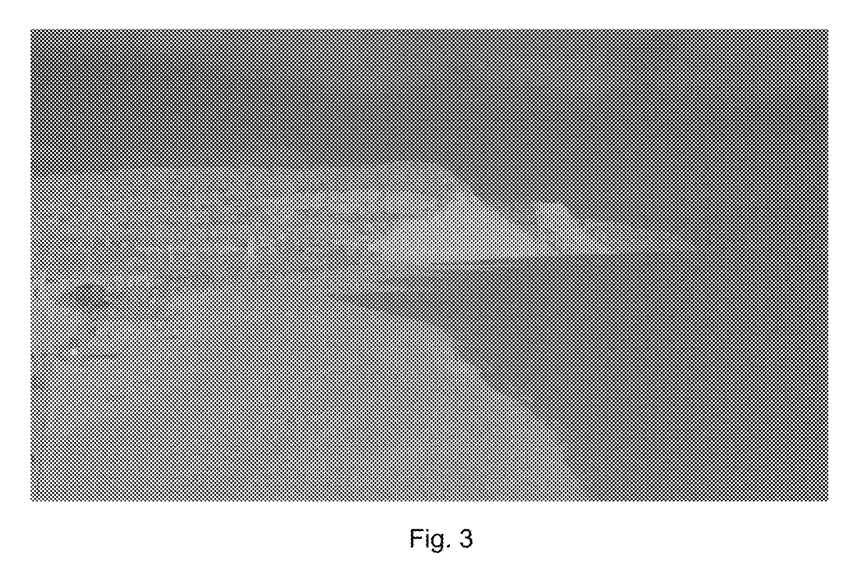
FIG. 3 represents a second color channel ('b' channel) of the color image representation shown in FIG. 1.

Media content that includes a color image (or color video) is represented in FIG. 1. An industry standard luminance and chrominance color space is called "Lab" (for Lightness (or luminance), plus 'a' and 'b' color channels) that can be used to separate components of images and video. FIG. 2 is an 'a' channel representation of FIG. 1 (shown in grayscale), and FIG. 3 is a 'b' channel representation of FIG. 1 (shown in grayscale). Of course, our inventive methods and apparatus will apply to and work with other color schemes and techniques as well. For example, alternative luminance and chrominance color schemes include "Yuv" (Y=luma, and 'u' and 'v' represent chrominance channels) and "Ycc." (also a dual chrominance space representation).

Figure 4:
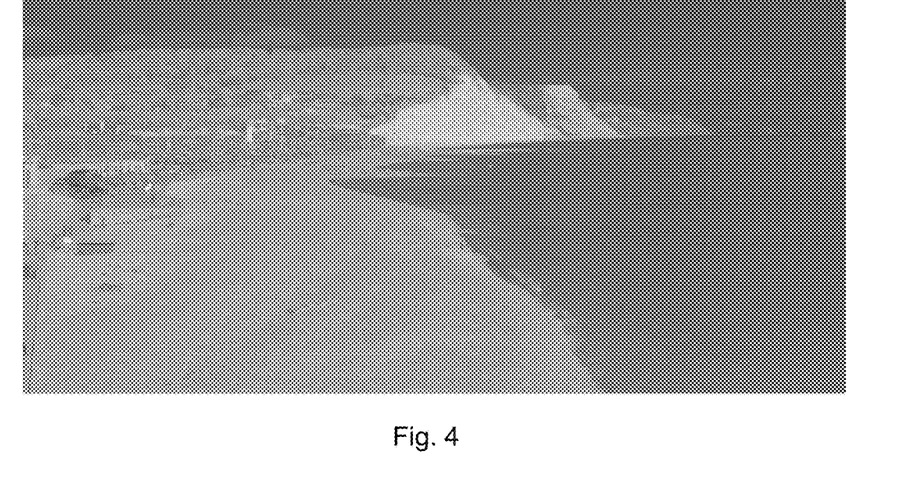
FIG. 4 is a representation of the sum of the first color channel of FIG. 2 and the second color channel of FIG. 3 (e.g., a+b).
Figure 5:
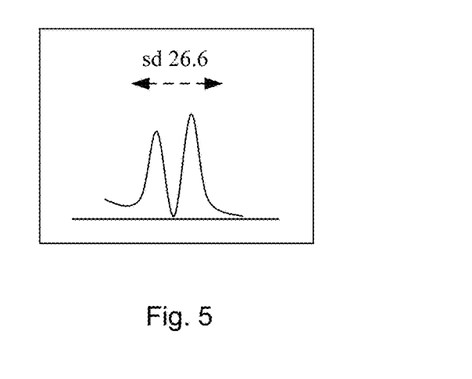
FIG. 5 is a graph showing a histogram standard deviation of FIG. 4.
Figure 6:
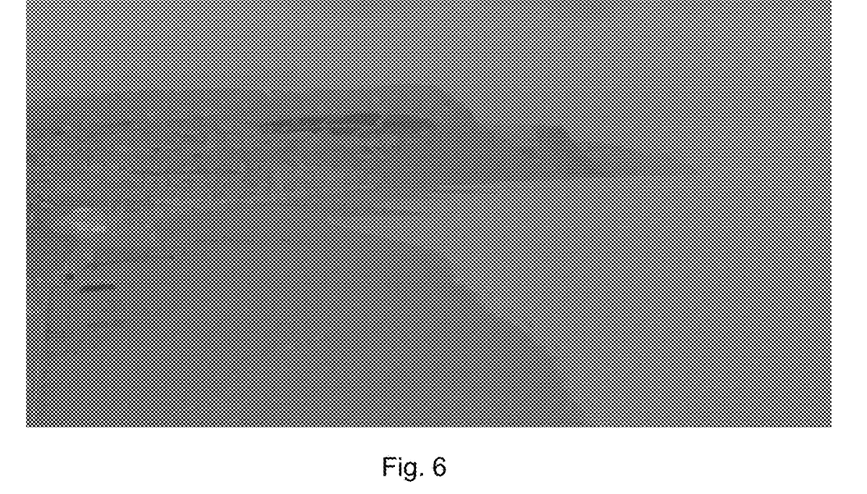
FIG. 6 is a representation of the difference between the first color channel of FIG. 2 and the second color channel of FIG. 3 (a−b).
Figure 7:
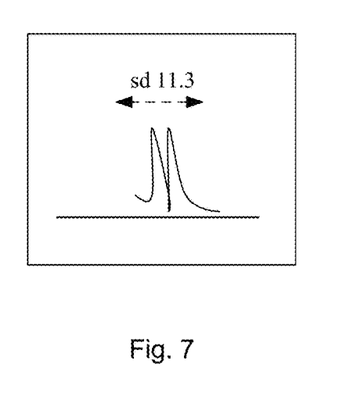
FIG. 7 is a graph showing a histogram standard deviation of FIG. 6.

Let's first discuss the additive and subtractive effects on FIGS. 2 and 3. FIG. 4 illustrates a representation of the result of adding the 'a' channel (FIG. 2) with the 'b' channel (FIG. 3). FIG. 6 illustrates a representation of the result of subtracting the 'b' channel (FIG. 3) from the 'a' channel (FIG. 2). The result of subtracting the 'b' channel from the 'a' channel yields reduced image content relative to adding the two channels since the 'a' and 'b' color planes have correlated image data in the Lab scheme. (In typical natural imagery, the 'a' and 'b' chrominance channels tend to be correlated. That is to say where 'a' increases, 'b' also tends to increase. One measure of this is to measure the histogram of the two chrominance planes when they are added (see FIG. 5), and compare that to the histogram when the two color planes are subtracted (see FIG. 7). The fact that the standard deviation of FIG. 7 is about half that of FIG. 5 also supports this conclusion, and illustrates the reduction in image content when 'b' is subtracted from 'a') In this regard, FIG. 4 provides enhanced or emphasized image content due to the correlation. Said another way, the subtraction of the FIG. 3 image from FIG. 2 image provides less image interference or reduces image content. The histogram representations of FIG. 4 and FIG. 6 (shown in FIGS. 5 and 7, respectively) further support this conclusion.

Now let's consider watermarking in the context of FIGS. 2 and 3.

In a case where a media signal includes (or may be broken into) at least two chrominance channels, a watermark embedder may insert digital watermarking in both the 'a' color direction (FIG. 2) and 'b' color direction (FIG. 3). This embedding can be preformed in parallel (if using two or more encoders) or serial (if using one encoder). The watermark embedder may vary the gain (or signal strength) of the watermark signal in the 'a' and 'b' channel to achieve improved hiding of the watermark signal. For example, the 'a' channel may have a watermark signal embedded with signal strength that greater or less than the watermark signal in the 'b' channel. Alternatively, the watermark signal may be embedded with the same strength in both the 'a' and 'b' channels. Regardless of the watermark embedding strength, watermark signal polarity is preferably inverted in the 'b' color plane relative to the 'a' color plane. The inverted signal polarity is represented by a minus ("−") sign in equations 1 and 2.

$$WMa = a(\text{channel}) + wm \quad (1)$$

$$WMb = b(\text{channel}) - wm \quad (2)$$

WMa is a watermarked 'a' channel, WMb is a watermarked 'b' channel, and wm represents a watermark signal. A watermarked color image (including L and WMb and WMa) can be provided, e.g., for printing, digital transfer or viewing.

An embedded color image is obtained (from optical scan data, memory, transmission channel, etc.), and data representing the color image is communicated to a watermark detector for analysis. The detector (or a process, processor or electronic processing circuitry used in conjunction with the detector) subtracts WMb from WMa resulting in WMres as shown below:

$$WMres=WMa-WMb \qquad (3)$$

$$WMres=(a+wm)-(b-wm) \qquad (4)$$

$$WMres=(a-b)+2*wm \qquad (5)$$

This subtraction operation yields reduced image content (e.g., FIG. 6) as discussed above. The subtraction or inverting operation of the color channels also emphasizes or increases the watermark signal (2*wm), producing a stronger watermark signal for watermark detection. Indeed, subtracting the color channels increases the watermark signal-to-media content ratio: WMres=(a-b)+2*wm.

Figure 8:
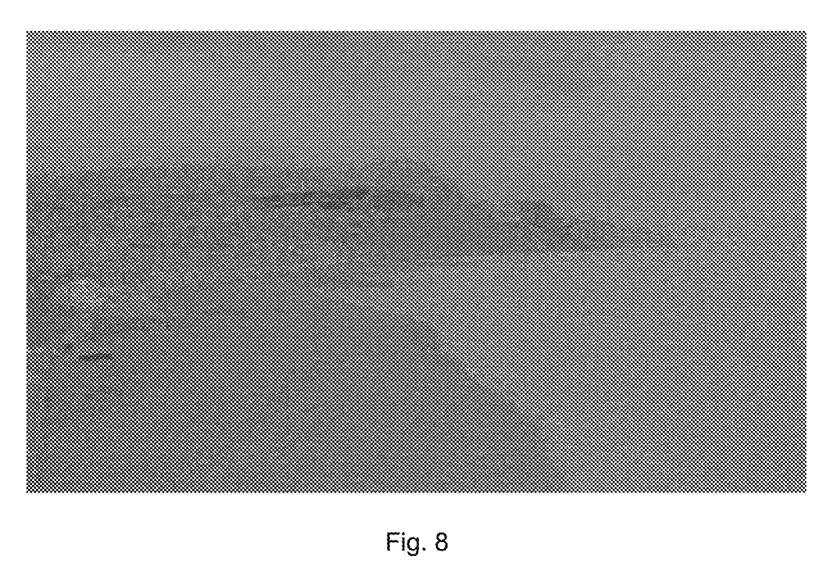
FIG. 8 is an image representation of the difference between the first color channel of FIG. 2 (including a watermark signal embedded therein) and the second color channel of FIG. 3 (including the watermark signal embedded therein).
Figure 9:
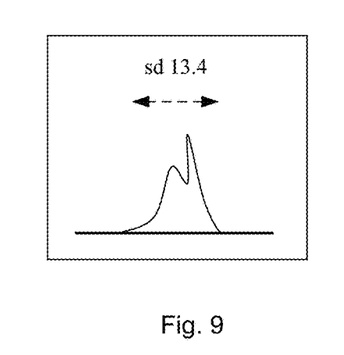
FIG. 9 is a graph showing a histogram standard deviation of FIG. 8.

FIG. 8 illustrates the result of equation 5 (with respect to watermarked versions of FIG. 2 and FIG. 3). As shown, the perceptual "graininess" or "noise" in the image corresponds to the emphasized watermark signal. The image content is also reduced in FIG. 8. A histogram representation of FIG. 8 is shown in FIG. 9 and illustrates a favorable reduction of image content.

A watermark detector may extract or utilize characteristics associated with a synchronization signal (if present) from a frequency domain representation of WMres. The detector may then use this synchronization signal to resolve scale, orientation, and origin of the watermark signal. The detector may then detect the watermark signal and obtain any message or payload carried thereby.

To even further illustrate the effects of improving the watermark signal-to-media content ratio with our inventive processes and systems, we provide some additive and subtractive examples in the content of watermarking.

For the following example, a watermark signal with the same polarity is embedded in each of the 'a' color channel and the 'b' color channel. The same signal polarity is represented by a plus ("+") sign in equations 6 and 7.

$$WMa=a+wm \qquad (6)$$

$$WMb=b+wm \qquad (7)$$

WMa is a watermarked 'a' channel, WMb is a watermarked 'b' channel, and wm represents a watermark signal. A watermarked color image (including L and WMb and WMa) can be provided, e.g., for printing, digital transfer or viewing.

An embedded color image is obtained, and data representing the color image is communicated to a watermarked detector for analysis. The detector (or a process, processor, or electronic processing circuitry used in conjunction with the detector) adds the 'a' and 'b' color channels to one another (resulting in WMres) as shown below:

$$WMres=WMa+WMb \qquad (8)$$

$$WMres=(a+wm)+(b+wm) \qquad (9)$$

$$WMres=(a+b)+2*wm \qquad (10)$$

This addition operation results in increased image content (e.g., FIG. 4). Indeed, image interference during watermark detection will be greater since the two correlated 'a' and 'b' color channels tend to reinforce each other.

By way of further example, if WMb is subtracted from WMa (with watermark signals having the same polarity), the following results:

$$WMres=WMa-WMb \qquad (11)$$

$$WMres=(a+wm)-(b+wm) \qquad (12)$$

$$WMres=(a-b)+\approx 0*wm \qquad (13)$$

A subtraction or inverting operation in a case where a watermark signal includes the same polarity decreases image content (e.g., FIG. 4), but also significantly decreases the watermark signal. This may result in poor—if any—watermark detection.

Figure 10A:
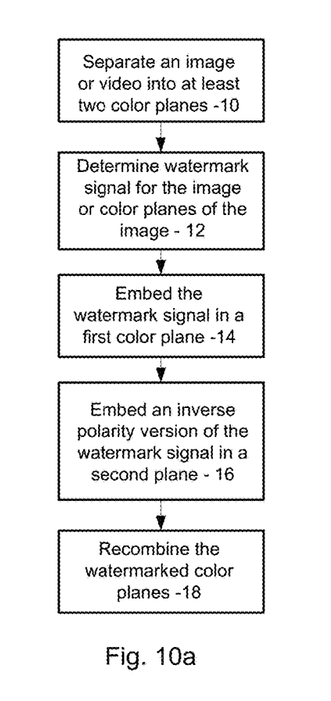
FIGS. 10a and 10b are block diagrams showing, respectively, an embedding process and a detection process.
Figure 10B:
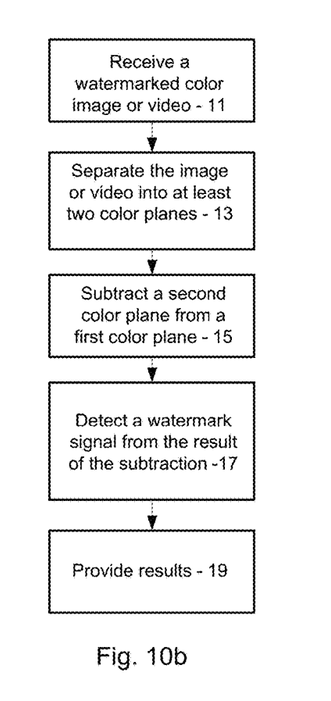

FIGS. 10a and 10b are flow diagrams illustrating some related processes and methods. These processes may be carried out, e.g., via a computer processor, electronic processing circuitry, printer, handheld device such as a smart cell phone, etc.

With reference to FIG. 10a, a color image (or video) is obtained and separated into at least two (2) color channels or planes (10). A watermark signal is determined for the color image or video (12). Of course, the watermark signal for the color image or video may be determined prior to or after color plane separation. The determined watermark signal is embedded in a first of the color planes (14). An inverse polarity version of the watermark signal is embedded in a second color plane. The color planes are recombined (perhaps with data representing luminance) to form a composite color image.

With reference to FIG. 10b, a watermarked color image or video is obtained or received (11). The color image (or video) has or can be separated into at least two (2) color planes or channels (13). A first color plane includes a watermark signal embedded therein. A second color plane includes the watermark signal embedded therein with a polarity that is inversely related to the watermark signal in the first color plane. The watermarked second color plane is subtracted from the watermarked first color (15). The result of the subtraction is analyzed to detect the watermark signal. A detected watermark message, signal or payload can be provided (19), e.g., to a remote database to obtain related metadata or information, to a local processor, for display, to a rights management system, to facilitate an online transaction, etc.

In addition to the Lab color scheme discussed above, a watermark signal may be embedded in color image (or video) data represented by RGB, Yuv, Ycc, CMYK or other color schemes, with, e.g., a watermark signal inserted in a first chrominance direction (e.g., red/green direction, similar to that discussed above for the 'a' channel) and a second chrominance direction (e.g., a blue/yellow direction, similar to that discussed above for the 'b' channel). For watermark signal detection with an alternative color space, e.g., an RGB or CMYK color space, an image can be converted to Lab (or other color space), or appropriate weights of, e.g., RGB or CMY channels, can be used. For example, the following RGB weights may be used to calculate 'a'-'b': Chrominance Difference=0.35*R-1.05*G+0.70*B+128, where R, G and B are 8-bit integers.

Further Considerations of Video

The human contrast sensitivity function curve shape with temporal frequency (e.g., relative to time) has a very similar shape to the contrast sensitivity with spatial frequency.

Successive frames in a video are typically cycled at about at least 60 Hz to avoid objectionable visual flicker. So-called "flicker" is due to the high sensitivity of the human visual system (HVS) to high temporal frequency changes in luminance. The human eye is about ten (10) times less sensitive to high temporal frequency chrominance changes.

Figure 11:
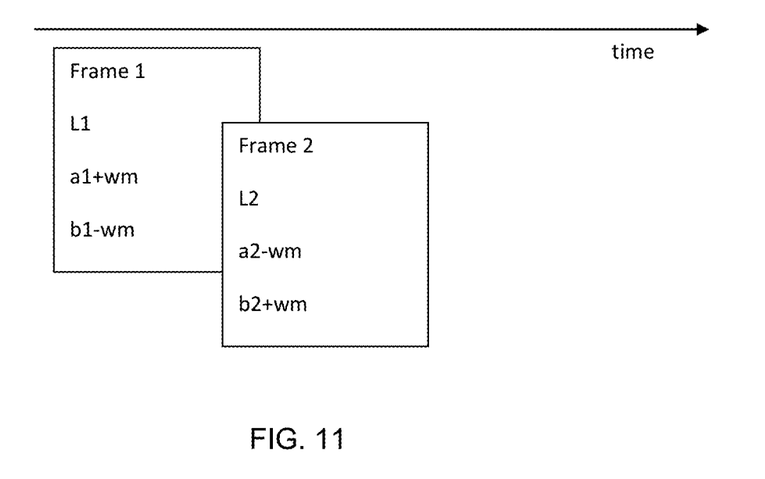
FIG. 11 is a diagram showing watermarks embedded in first and second video frames.

Consider a video sequence with frames as shown in FIG. 11. A chrominance watermark can be added to frame 1 per the above description for images. In a similar way, a watermark is added to frame 2 but the polarity is inverted as shown in FIG. 11.

In order to recover the watermark, pairs of frames are processed by a watermark detector, and the 'a' channels are subtracted from each other as shown below.

$$Det\_a=(a1+wm)-(a2-wm)=(a1-a2)+2*wm \quad (14)$$

Det_a refers to watermark detection processing of the 'a' channel. Because of the temporal correlation between frames, the image content in equation 14 is reduced while the watermark signal is reinforced.

In a similar way the 'b' channels are also subtracted from each other $$Det\_b=(b1-wm)-(b2+wm)=(b1-b2)-2*wm \quad (15)$$

Det_a refers to watermark detection processing of the 'b' channel. Equation 14 and 15 are then subtracted from each other as shown below in equation 16.

$$Det\_a-Det\_b=(a1-a2+2*wm)-(b1-b2-2*wm)=(a1-a2)-(b1-b2)+4*wm \quad (16)$$

In generally, related (but not necessarily immediately adjacent) frames will have spatially correlated content. Because of the spatial correlation between the 'a' and 'b' frames, the image content is reduced while the watermark signal is reinforced. See equation 16.

For any one pair of frames selected by a watermark detector, the polarity of the watermark could be either positive or negative. To allow for this, the watermark detector may examine both polarities.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicant hereby incorporates by reference each of the above referenced patent documents in its entirety.

The methods, processes, components, apparatus and systems described above may be implemented in hardware, software or a combination of hardware and software. For example, the watermark encoding processes and embedders may be implemented in software, firmware, hardware, combinations of software, firmware and hardware, a programmable computer, electronic processing circuitry, and/or by executing software or instructions with a processor or circuitry. Similarly, watermark data decoding or decoders may be implemented in software, firmware, hardware, combinations of software, firmware and hardware, a programmable computer, electronic processing circuitry, and/or by executing software or instructions with a processor, parallel processors or other multi-processor configurations.

The methods and processes described above (e.g., watermark embedders and detectors) also may be implemented in software programs (e.g., written in C, C++, Visual Basic, Java, Python, Tcl, Perl, Scheme, Ruby, executable binary files, etc.) stored in memory (e.g., a computer readable medium, such as an electronic, optical or magnetic storage device) and executed by a processor (or electronic processing circuitry, hardware, digital circuit, etc.).

While one embodiment discusses inverting the polarity in a second color channel (e.g., a 'b' channel), one could also invert the polarity in the first color channel (e.g., an 'a' channel) instead. In such a case, the first color channel is then preferably subtracted from the second color channel.

The particular combinations of elements and features in the above-detailed embodiments are exemplary only; the interchanging and substitution of these teachings with other teachings in this and the incorporated-by-reference patents are also contemplated.

What is claimed is:

1. A detector apparatus comprising:
   memory for storing color image data comprising first color data and second color data, in which the first color data comprises digital watermarking including a first polarity and the second color data comprises the digital watermarking including a second polarity that is inversely related to the first polarity;
   one or more processors programmed for:
   weighting the first color data and the second color data so that the digital watermarking is emphasized while image content is de-emphasized when weighted first color data and weighted second color data are combined, in which said weighting aligns digital watermarking detection along a multi-axis direction;
   detecting the digital watermarking from combined, weighted first color data and weighted second color data; and
   outputting data corresponding to detected digital watermarking.

2. The detector apparatus of claim 1 in which combining the weighted first color data and the weighted second color data subtracts the weighted second color data from the weighted first color data to yield the combined, weighted first color data and weighted second color data.

3. The detector apparatus of claim 1 in which said weighting aligns digital watermarking detection along an a–b direction, where a represents a first multi-color axis, and b represents a second multi-color axis.

4. A handheld device comprising the detector apparatus of claim 3.

5. A cell phone comprising the handheld device of claim 4.

6. The detection apparatus of claim 1 in which the weighted first color data comprises weighted red/green color data and the weighted second color data comprises weighted yellow/blue color data.

7. The detection apparatus of claim 1 in which the image color data also comprises blue color data, and the first color data comprises red color data and the second color data comprises green color data, in which said weighting the first color data and the second color data also weights the blue color data so that the digital watermarking is emphasized while image content is de-emphasized when weighted red color data, weighted green color data and weighted blue color data are combined.

8. The detection apparatus of claim 7 in which the weighted red color data, the weighted green color data and the weighted blue color data are combined according to 0.35*red color data−1.05*green color data+0.70*blue color data, plus a constant.

9. A detector apparatus comprising:
   memory for storing color image data comprising first color data and second color data, in which the first color data comprises signal encoding including a first polarity and the second color data comprises the signal encoding including a second polarity that is inversely related to the first polarity, and in which the first color data corresponds to a first multi-color axis, and the second color data corresponds to a second multi-color axis;

one or more processors configured for:

combining the first color data and the second color data by subtracting the second color data and the first color data, the subtracting emphasizing the signal encoding while de-emphasizing image content;

detecting the signal encoding from the combined first color data and second color data; and controlling output of data corresponding to detected signal encoding.

10. A handheld device comprising the detector apparatus of claim 9.

11. A cell phone comprising the handheld device of claim 10.

12. The detector apparatus of claim 9 in which said combining aligns signal encoding detection along an a–b color direction.

13. A detector apparatus comprising:

memory for storing color image data comprising first color data and second color data, in which the first color data comprises signal encoding including a first polarity and the second color data comprises the signal encoding including a second polarity that is inversely related to the first polarity;

means for weighting the first color data and the second color data so that the digital watermarking is emphasized while image content is de-emphasized when weighted first color data and weighted second color data are combined, in which said means for weighting aligns signal encoding detection along a multi-axis direction;

means for detecting the signal encoding from combined, weighted first color data and weighted second green data; and one or more processors configured for outputting data corresponding to detected signal encoding.

14. The detector apparatus of claim 13 comprising means for combining the weighted first color data and the weighted second color data by subtracting the weighted second color data from the weighted first color data, said means for combining yielding the combined, weighted first color data and weighted second color data.

15. The detector apparatus of claim 13 in which said means for weighting aligns signal encoding detection along an a–b direction, where a represents a first multi-color axis, and b represents a second multi-color axis.

16. A handheld device comprising the detector apparatus of claim 13.

17. A cell phone comprising the handheld device of claim 16.

* * * * *